(12) United States Patent
Fox et al.

(10) Patent No.: US 7,877,264 B2
(45) Date of Patent: Jan. 25, 2011

(54) INTELLIGENT TRUST MANAGEMENT METHOD AND SYSTEM

(75) Inventors: Barbara L. Fox, Seattle, WA (US); Brian A. LaMacchia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 11/273,143

(22) Filed: Nov. 14, 2005

(65) Prior Publication Data

US 2006/0069590 A1 Mar. 30, 2006

Related U.S. Application Data

(63) Continuation of application No. 09/071,594, filed on May 1, 1998, now Pat. No. 6,965,999.

(51) Int. Cl.
*G06Q 40/00* (2006.01)
(52) U.S. Cl. .............................. 705/1; 705/35
(58) Field of Classification Search ............... 705/1–50; 395/186; 707/104.1, 201
See application file for complete search history.

(56) References Cited

U.S. PATENT DOCUMENTS

| | | | |
|---|---|---|---|
| 5,560,008 A | 9/1996 | Johnson et al. ............. 395/650 |
| 5,815,571 A | 9/1998 | Finley ............................ 380/4 |
| 5,892,905 A * | 4/1999 | Brandt et al. ................. 726/11 |
| 5,915,087 A | 6/1999 | Hammond et al. ...... 395/187.01 |
| 5,922,074 A | 7/1999 | Richard et al. .............. 713/200 |
| 5,925,126 A | 7/1999 | Hsieh ........................ 713/200 |
| 5,958,050 A | 9/1999 | Griffin et al. ................. 713/200 |
| 5,978,484 A | 11/1999 | Apperson et al. ............. 380/25 |
| 5,987,608 A | 11/1999 | Roskind ..................... 713/200 |
| 5,991,877 A | 11/1999 | Luckenbaugh .............. 713/200 |
| 6,101,255 A * | 8/2000 | Harrison et al. .............. 380/52 |

(Continued)

FOREIGN PATENT DOCUMENTS

EP 0 913 967 5/1999

(Continued)

OTHER PUBLICATIONS

Blaze et al., "Decentralized Trust Management,", DIMACS Technical Report 96-17, Oct. 1996.

(Continued)

*Primary Examiner*—Mary Cheung
*Assistant Examiner*—Marissa Liu
(74) *Attorney, Agent, or Firm*—Merchant & Gould PC

(57) ABSTRACT

Intelligent Trust Management provides a centralized security facility that gives system components a flexible mechanism for implementing security policies. System components such as applications create a request describing an action that needs to be checked against an appropriate security policy. The request is given to a trust system that determines which policy object applies to the request, and may pass request arguments to the policy. The policy objects include executable code that uses any arguments along with dynamically obtained variable information to make a decision. The decision is returned to the system component, which then operates accordingly. Policy objects may maintain state and interface with the user independent of the system component in order to obtain information to make their decisions. Policy objects may call other policy objects and/or mathematically combine the results of other policy objects to make a decision.

16 Claims, 6 Drawing Sheets

U.S. PATENT DOCUMENTS

| | | | | |
|---|---|---|---|---|
| 6,108,788 | A | * | 8/2000 | Moses et al. ................. 713/155 |
| 6,167,445 | A | * | 12/2000 | Gai et al. .................... 709/223 |
| 6,317,868 | B1 | | 11/2001 | Grin et al. ................... 709/225 |
| 6,965,999 | B2 | * | 11/2005 | Fox et al. ....................... 726/22 |
| 2002/0016790 | A1 | * | 2/2002 | Arnold et al. ............ 707/104.1 |

FOREIGN PATENT DOCUMENTS

| WO | WO97/00475 | 1/1997 |
|---|---|---|
| WO | WO98/21683 | 5/1998 |

OTHER PUBLICATIONS

Chu et al., "Referee: Trust Management for Web Applications," http:www2.farcaster,com/papers/www6-referee/www6-referee. html, Feb. 18, 1998.

Abrams et al., "A Higher Level of Computer Security Through Active Policies," Computers & Security International Journal Devoted to the Study of Technical and Financial Aspects of Computer Security, vol. 14, No. 2, pp. 147-157, Jan. 1, 1995.

International Search Report in Corresponding PCT Application No. PCT/US99/08272.

* cited by examiner

| System Component | ITM Manager | Policy Manager | Policy |
|---|---|---|---|
| Bundle Policy Decision Request, (Action ID, Args), Send to ITM Manager | | | |
| | Extract Action ID, Access Policy Manager | | |
| | | Instantiate Corresponding Policy Object | |
| | Pass Arguments, Context to Policy Object | | |
| | | | Make Decision Based on Arguments and Variable Information (State, UI) |
| | | | Return Decision to ITM Manager |
| | Return Decision to System Component | | |

Time

*FIG. 4*

INTELLIGENT TRUST MANAGEMENT METHOD AND SYSTEM

FIELD OF THE INVENTION

The invention relates generally to computer systems, and more particularly to improvements in trust management for computer systems.

BACKGROUND OF THE INVENTION

Trust management is directed to the concept of controlling decisions made by system components such as applications with respect to certain potentially dangerous actions. In general, to make an appropriate decision, an application's desired action is verified against a policy. A policy for a particular action is a set of rules that determine whether that particular action is allowed or denied. By way of example, a web browser may make a decision on whether to download executable code from the Internet based on a policy comprising explicit user preferences and the validity of a digital signature on the code. Similarly, a certificate authority makes a decision whether to issue a certificate based on whether the requester complies with its policy for establishing its identity, while a secure operating system such as Microsoft Windows NT decides whether to log on a user based on a policy of whether the correct account password was supplied, the account is not locked out and whether other constraints, such as logon time and date restrictions, are not violated.

However, although in general the operation of verifying a request for action against a policy is common to trust management in applications, policy evaluation implementations are different in each application. For example, policies are represented in different ways in each application, and sometimes difficult for users to locate or recognize. Moreover, because the policies are built into the applications, the policies are essentially static and only minimally modifiable as limited by a few optional settings. As a result, there is no easy way to modify or add new policy constraints to policies used by applications to control their decisions, nor is there an easy way to enforce new domain-wide policies. Administrators of large (enterprise) networks are often forced to go to great lengths to uniformly implement policies.

SUMMARY OF THE INVENTION

Briefly, the present invention provides a system and method of using a policy to make a decision on a proposed action of a system component such as an application. In accordance with the present invention, policies are centrally maintained system resources available to any system component through an intelligent trust manager. Action information including the proposed action is received from a system component, and the action information is used to obtain a policy corresponding to the proposed action. To this end, the policy may be implemented in a COM object mapped by a policy manager to the action identified in the action information. The policy dynamically obtains variable information at the policy from a source independent of the system component, such as via state maintained in the policy, from other context, through a user interface, or from an external source such as a website. The policy makes a decision via executable code therein, based on the variable information obtained thereby, and returns the decision to the system component.

Other advantages will become apparent from the following detailed description when taken in conjunction with the drawings, in which:

BRIEF DESCRIPTION OF THE DRAWINGS

FIG. 4 is a timing chart representing the steps taken by the various components of the trust management system to produce a policy decision;

DETAILED DESCRIPTION

Exemplary Operating Environment

Figure 1:
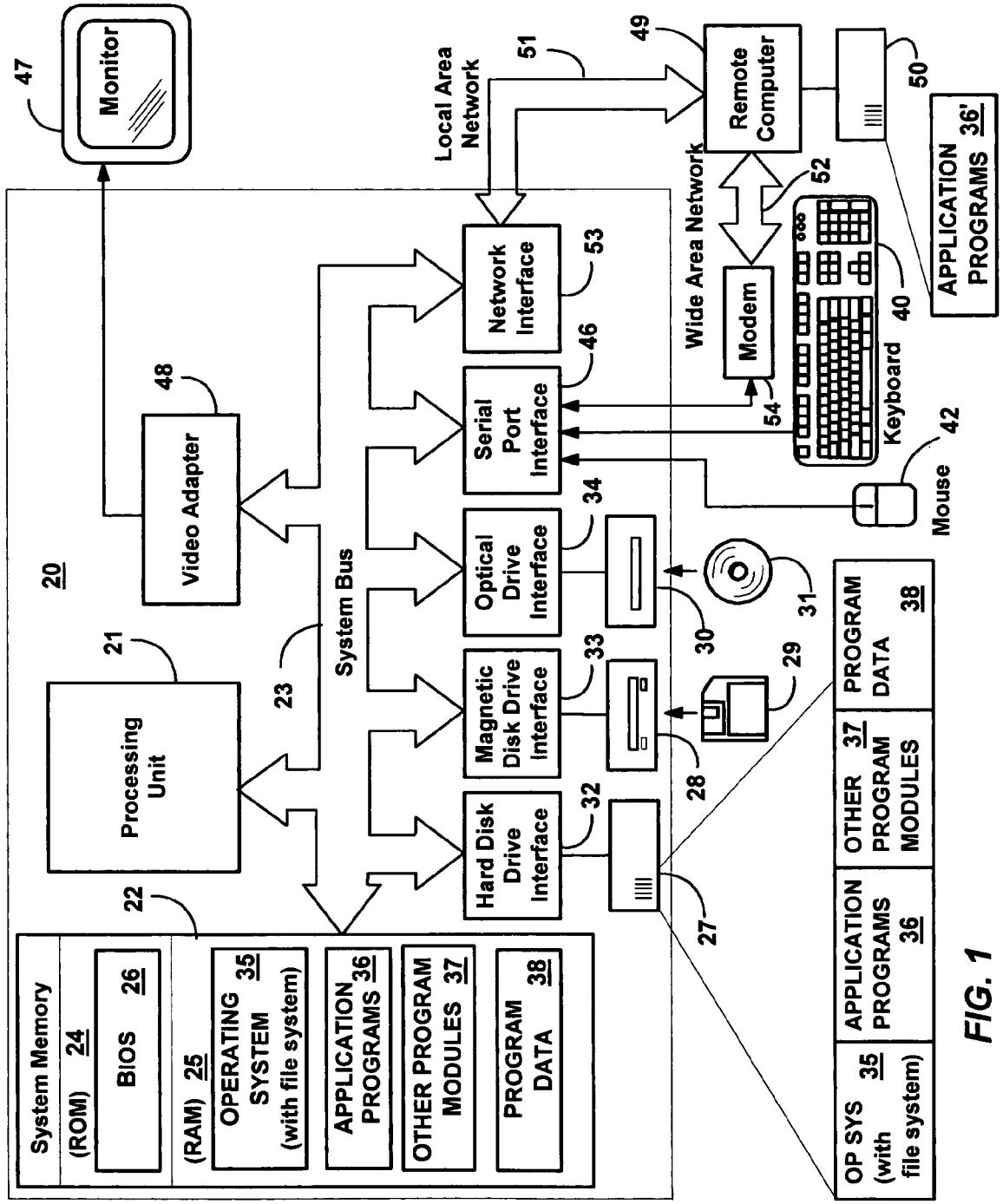
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The preferred implementation of the present invention is described herein with reference to the Component Object Model (COM). COM is a well-documented technology in which clients access services provided by COM objects by accessing methods therein through interfaces of the COM objects. COM provides for extensibility and future compatibility, and moreover, because policies (described below) are COM objects, they may be written in well-known and easy-to-use scripting languages such as VBScript and Jscript, or more powerful languages such as $C^{++}$. For purposes of simplicity, a detailed discussion of COM is not included herein; a detailed description of COM objects is provided in the reference entitled "Inside OLE," second edition, Kraig Brockschmidt, Microsoft Press (1993), hereby incorporated by reference. Note that although COM is preferably used to implement the present invention, there is no intention to limit the present invention to a COM implementation. For example, as will be readily appreciated, the present invention may alternatively be implemented via application programming interface calls to functions or other equivalent implementations.

Intelligent Trust Management

Figure 2:
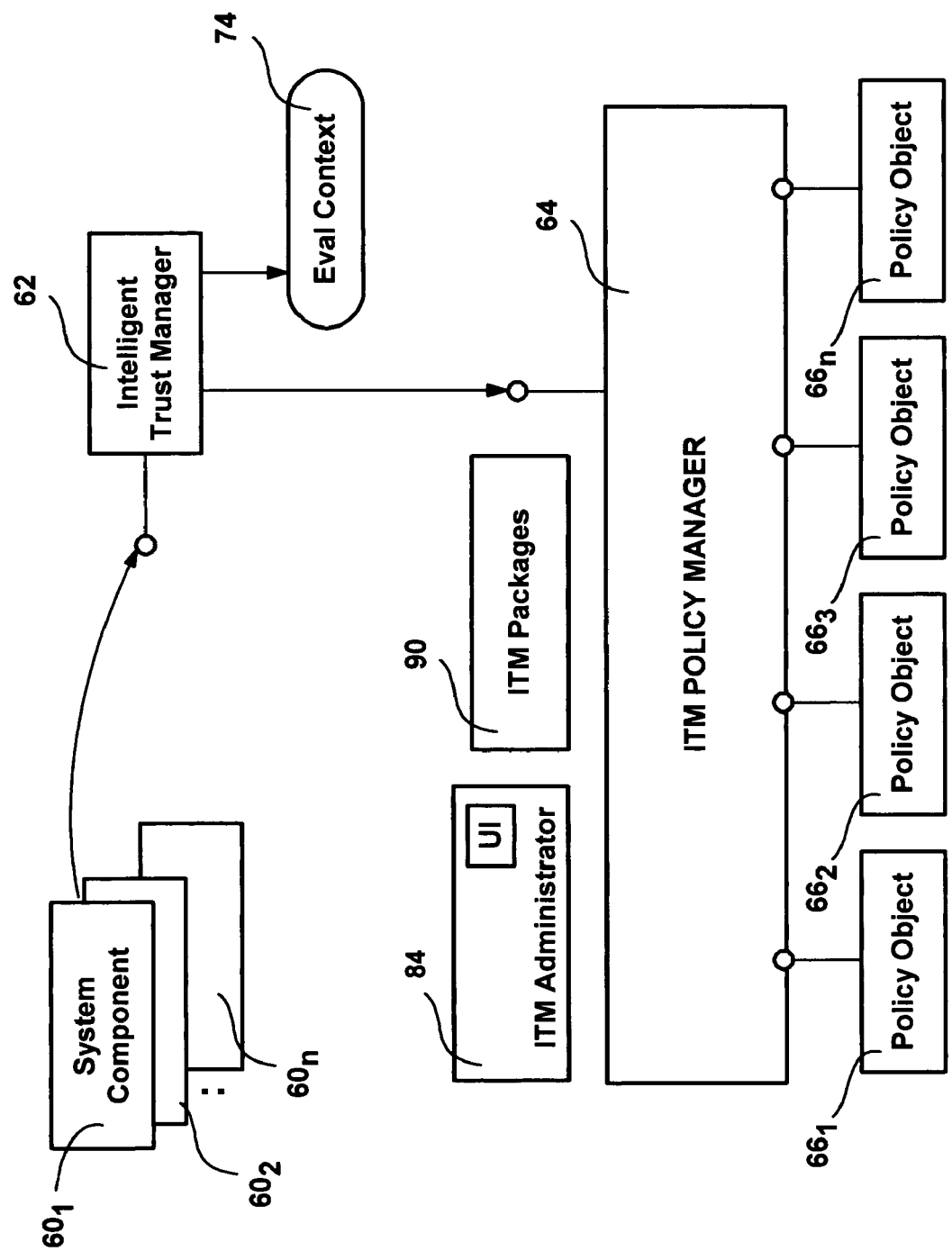
FIG. 2 is a block diagram generally representing the conceptual model of the present invention.

FIG. 2 shows the general conceptual model of the present invention wherein system components $60_1$-$60_n$ (e.g., applications) make calls to an intelligent trust manager 62 in order to have trust decisions made therefor in accordance with a predetermined policy. To obtain a decision, the intelligent trust manager 62 in turn communicates with a policy manager 64 to invoke an appropriate one of the policy objects $66_1$-$66_n$. The corresponding policy object (e.g. $66_3$) makes an advisory decision, i.e., yes, no or insufficient information to make a determination, and returns the decision to the system component (e.g., $60_1$) via the intelligent trust manager 62. Note that a request may correspond to more than one policy object, but for purposes of simplicity herein, a request will generally only be passed to one policy object. Note however, (as described in more detail below), the corresponding policy object may itself call on one or more other policy objects and use their decisions to make its final decision.

As represented in FIG. 2 and in accordance with one aspect of the present invention, policies are centrally maintained system resources available in a consistent manner to any system component of the system, yet policies are removed and isolated from the system components, and transparent thereto. To add a policy, the policy is appropriately registered like any other COM object, however for security purposes, the registration operation itself is typically subject to a policy, as described below. To replace a policy with another policy, the other policy is registered and the name binding (described below) changed so those system components using the name invoke the other policy instead of the existing policy. Among other benefits, the present invention thus allows policies to be shared by numerous system components, while essentially shielding the system components from the details of policy administration. Since policy objects are COM objects, they include executable code for making decisions, and moreover, may maintain state, generate their own user interface, and include one or more inference engines (deductive processes) to make decisions. In addition, they may be named, whereby administrators may intuitively locate and reference the appropriate policy object as needed, and may be digitally signed, which enables verifying the integrity of the policy object for security purposes, such as when registering and/or invoking the object. Note that although the various components are shown as directly connected in FIG. 2, it may be readily appreciated that the components and/or divisible portions thereof may be distributed throughout various systems of a network. Indeed, as will be described below, in enterprise networks, policies are often maintained throughout a domain, wherein client applications communicate with a domain server to access policies and receive decisions.

Figure 3:
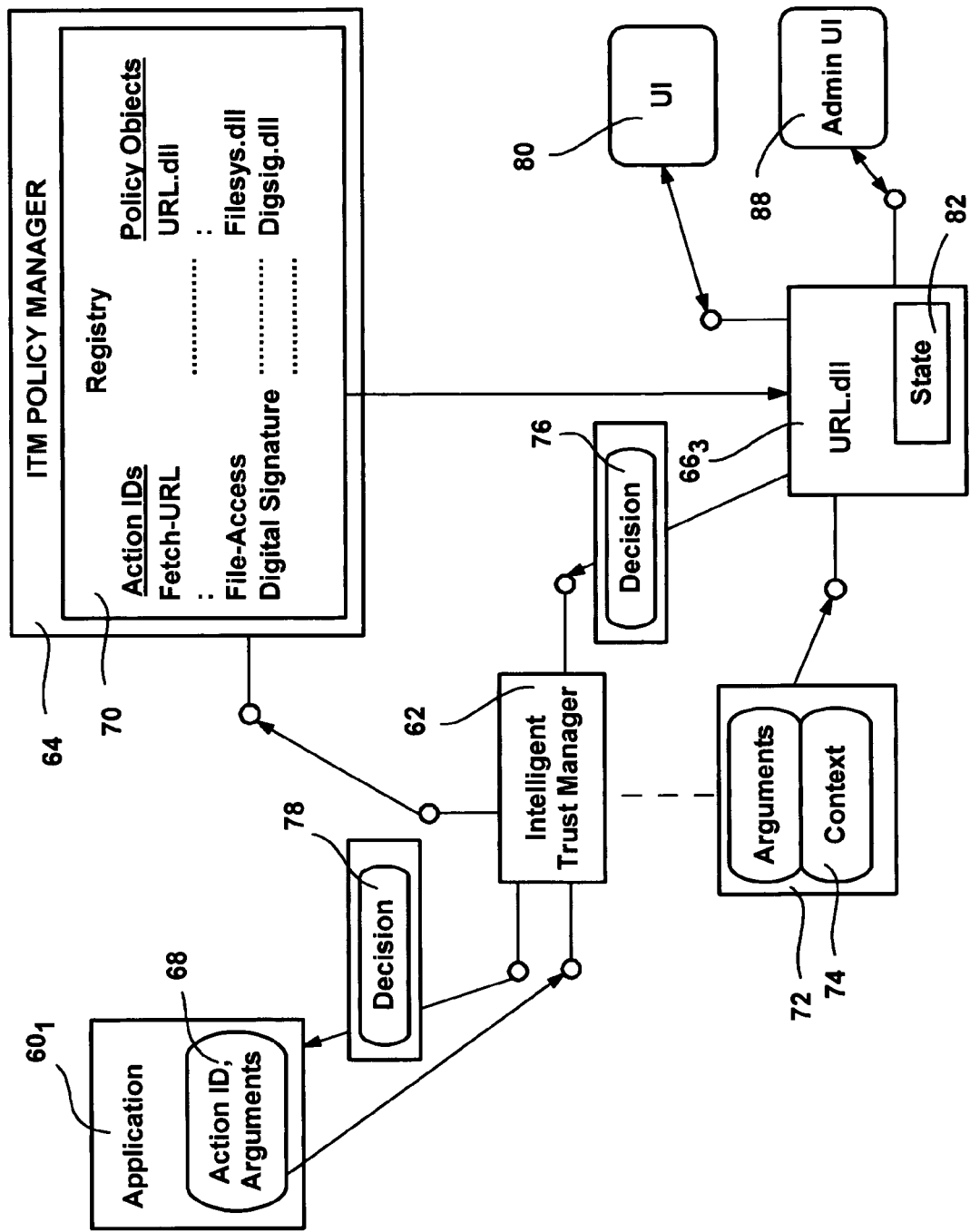
FIG. 3 is a block diagram generally representing the various components for implementing the trust management system of the present invention.

As shown in more detail in FIG. 3, and as represented in the timing chart of FIG. 4, the application (e.g., system component $60_1$) initiates the decision making process when the application $60_1$ needs to determine whether a potentially dangerous action that it is proposing to take is allowed or forbidden in accordance with a policy. By way of example, a browser application (e.g., $60_1$) that has been instructed by a user to download content from a website first will find out whether the action is allowable before following the instruction. To obtain a decision, the application $60_1$ bundles action information including a name or the like identifying the desired action and policy-specific arguments into a request 68 (e.g., a COM request object), and invokes a method of the intelligent trust manager 62 requesting a decision. Alternatively, one or more of the arguments may be maintained in an alternate location in the system, wherein the location is previously known to the policy, or the location is identified by the application $60_1$. In addition, the application $60_1$ may pass optional evidence to the intelligent trust manager 62, such as a security identifier that may be required to access certain files with certain rights. Note that in the implementation described herein, the application $60_1$ needs to know which policy it is invoking, as well as the arguments expected by the policy. Alternatively, however, the application $60_1$ may query the intelligent trust manager 62 to ascertain the available policies and/or any requirements thereof.

When the intelligent trust manager 62 receives the request 68, the intelligent trust manager 62 extracts the action identifier from the passed information therein. The intelligent trust manager 62 provides the ITM policy manager 64 with the policy name, whereby the corresponding policy object (e.g., $66_3$) is instantiated. Note that the ITM policy manager 64 includes or otherwise has access to a registry 70 (e.g., database, library, table or the like) that maps each action identifier to the appropriate policy object. More particularly, trust policy is a COM object implementing the ITrustPolicy interface. When the policy is queried for its decision about particular request for action, it receives a pointer to another COM object implementing ITrustable interface on input, and returns Trusted, Completely Trusted or Untrusted as output. The ITrustable interface is used encapsulate the application-specific request for action.

By way of example, consider the browser described above wherein a decision is needed on whether to download content from a site. In the request 68, the application $60_1$ identifies an action called "Fetch-URL" and also passes the URL (Uniform Resource Locator) of the site (e.g., www.site1.com) as an argument to the intelligent trust manager 62. The intelligent trust manager 62 takes the action identifier "Fetch-URL" and via the ITM policy manager 64, looks up and instantiates the corresponding policy object $66_3$, i.e., "URL.dll" in the present example.

Once the corresponding policy object $66_3$ is instantiated, the intelligent trust manager 62 forwards the appropriate arguments 72 (including any optional evidence) thereto, along with any context 74 that may be available for passing to the policy object. For example, the intelligent trust manager 62 may pass information about the state of the machine, stack information, information about the application $60_1$ and so on to the policy object $66_3$, such as when the intelligent trust manager 62 knows or otherwise believes that such information would be useful to the policy object $66_3$ in making its decision.

At this time, the policy object $66_3$ executes its internal code to make a decision. If the answer may be immediately decided as "Yes" or "No" based on the available information, the policy object $66_3$ returns its decision 76 to the application $60_1$ via the intelligent trust manager 62 (although it is alternatively feasible for the policy object to directly return the decision and any accompanying information to the application). Along with the decision 76, the policy object $66_3$ may return information such as its rationale for making the decision. Similarly, if desired, the intelligent trust manager 62 may supplement the return information and provide an (optionally) supplemented decision 78. In this manner, system components (e.g., applications) may modify their request as desired. For example, if a decision to access a file for read and write access is "No" because as reported back, a security identifier is needed, the requesting system component may choose to retry the request a second time with the security identifier bundled with the request.

Moreover, the policy object (e.g., $66_3$) may respond that it is unable to make a determination based on the information currently available thereto, (i.e., "I don't know"). Along with such a response, the policy object may return a list or the like specifying the information that it needs to make a "Yes" or "No" decision. For example, a decision on whether to download a file may depend on what version of an application is being used. If the version information cannot, for example, be independently determined by the policy object, the policy object may respond that it is unable to make a determination, and identify the lack of the version information as the reason. The application may then supply the information in a subsequent request if it is able to do so.

In accordance with one aspect of the invention, the policy object is capable of making dynamic determinations based on additional variable information it obtains (i.e., receives or otherwise knows of) independent of the system component (e.g., application). For example, the context 74 passed by the intelligent trust manager 62 may be independent of the system component requesting the decision and make an otherwise "Yes" answer a "No" answer, and vice-versa. Moreover, the policy object may communicate with the user via its own user interface 80 completely independent of the system component.

By way of example, assume that the URL.dll policy $66_3$ is written so as to return a "No" decision for any website content exceeding a ratings guideline, unless a parental override password is provided. For purposes of this example, it may be assumed that the browser application $60_1$ is not aware of ratings, and is limited to either downloading the site's content or not doing so in accordance with the policy determination. Indeed, while contemporary browsers contain such ratings policies, as will be described herein, the present invention obviates the need for incorporating the policy into the browser application, whereby future browsers may very well not have any ratings policy.

When a request is made for a decision on www.site1.com, the policy object $66_3$ includes code for communicating with the site in order to determine the rating of the content that has been requested. Based on the rating, the policy object $66_3$ may immediately make its decision, i.e., if below a certain ratings threshold, respond "Yes." However, rather than respond "No" to content above a certain ratings threshold, the policy object itself may be written to communicate through the user interface 80 to attempt to obtain a parental override password. Significantly, the policy object $66_3$ is able to dynamically adjust as information comes in, and may obtain additional information as needed independent of the application $60_1$.

In accordance with another aspect of the present invention, the policy objects are able to maintain variable state information 82, both while instantiated and, if needed, persistently by writing state data to a file or the like. The state information 82 may be used to make decisions dynamically and independent of the system component. For example, consider a policy that has been set up such that company managers may purchase items for the company from certain approved Internet sites so long as the managers' purchases as a whole do not total over ten-thousand dollars per month. In addition to verifying the site, the appropriate policy object may make a dynamic decision by temporarily adding the requested purchase price to an accumulated monthly total maintained as state information 82 in the policy object to decide whether to allow the requested purchase. Indeed, even more dynamically, the policy object may obtain the price from the site and multiply by a requested quantity to determine a requested purchase amount. In either event, if below the monthly limit, a "Yes" decision is returned and the total is increased. If "No," a smaller purchase next time may instead be approved. Thus, the policy object dynamically decides based on a submitted amount (or possibly an item and quantity) against an accumulated variable total. As can be appreciated, the system component (e.g., application) that submits the purchase form need not know anything about the total, and only has to pass in the site URL and the requested amount (or quantity and item information). Note that this makes changing the policy such as by increasing the limit relatively simple, yet secure, as the limit need only be changed in one secure, centralized location rather than on every managers' separate copy of an application.

Figure 5A:
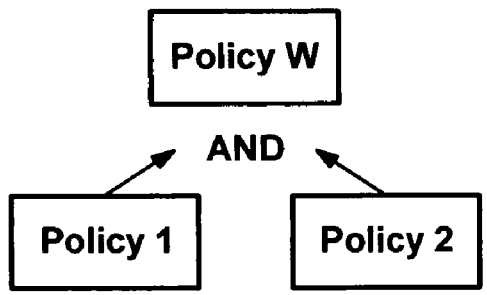
FIGS. 5A-5D are block diagrams representing various examples of how a plurality of policies may be combined to produce a final decision.
Figure 5B:
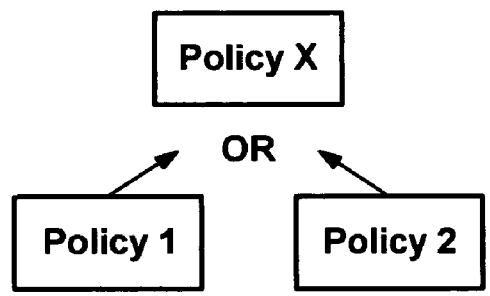
Figure 5C:
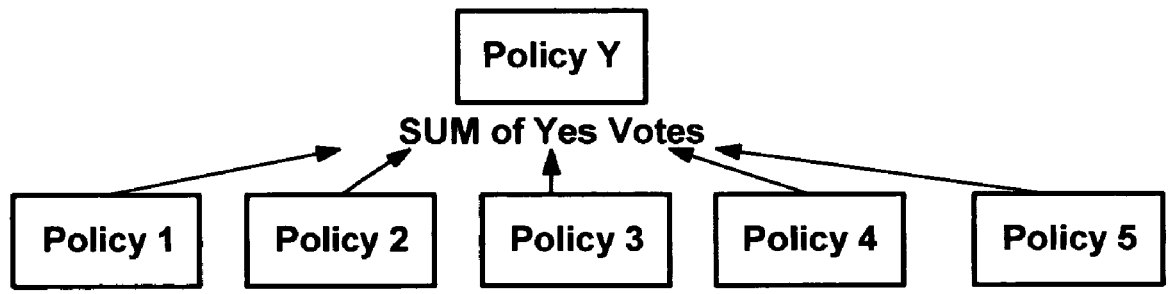
Figure 5D:
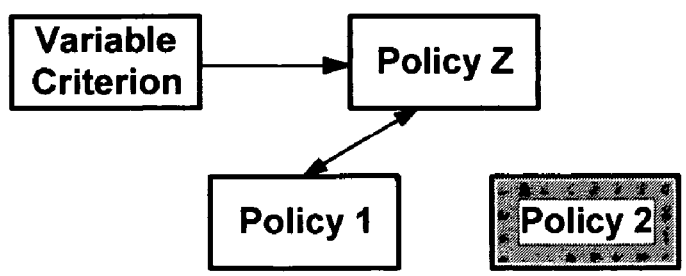

In accordance with another aspect of the invention, policies may be combined mathematically and/or built up in a hierarchical manner to make a decision. To this end, a policy can call other policies (which in turn can call still other policies) and use their decisions to make a final decision. For example, as shown in FIGS. 5A-5D, policy may decide "Yes" only if two other policies below it both decide "Yes" (FIG. 5A, Boolean AND), if one of two policies decide "Yes" (FIG. 5B, Boolean OR) and so on. A policy may also implement a voting scheme, for example, to decide "Yes" to an action if m out of n (e.g., three out of five) policies it calls decide "Yes" (FIG. 5C).

In addition, a policy may be flexibly written to accept arguments that inform that policy how to make its determination. For example, a Boolean policy may exist that takes as arguments the names of two or more other policies along with a logical operator (e.g., AND, OR, XOR), and returns a result based on the results of the other policies as combined by the logical operator. Similarly, a "voting" policy may exist that takes as input the total number of "Yes" votes needed from other policies to return a "Yes" vote, (wherein the names of the other polices may be passed as arguments or already known to the voting policy object). Result information may also be passed to a policy, e.g., for one system component, three or less "Yes" votes return a yes, but four or more return a "No", while for another system component, one or more "Yes" votes are needed for a "Yes" result.

In an alternative implementation, policy objects may return a result using a particular Boolean algebra scheme based on a "Trusted, Completely Trusted and Untrusted" model. In general, "Trusted" corresponds to "Yes," "Untrusted" to "No," while Completely Trusted" corresponds to "Yes, and do not process further." The "Completely Trusted" result is useful in situations wherein subpolicies vote to make a decision, and certain ("Completely Trusted") subpolicies are given more weight than others. As can be readily appreciated, other schemes (e.g., subpolicies can return multiple votes based on their weight) may also be implemented.

Moreover, since policies can call other policies, a policy may make its decision by selecting other policies based on virtually any variable criteria, such as the number of logged in users or the time of day. The following pseudocode along with FIG. 5D demonstrates this concept, wherein according to a general URL policy, one of two particular URL policies (URL-working-hours or URL after-hours) are in effect depending on the time of day:

URL Policy:

:
:
Time ( )

-continued

If Time > 8 am and < 5 pm
    ITM (URL-working-hours)
Else
    ITM (URL-after-hours)
:
:

The system component requesting the URL policy decision need know nothing about which policy is actually in effect, as it only requests a decision on an action from the URL policy, which unknown to the system component, calls on one of the other two policies to make the decision. While of course such a simplified example may be implemented in a single policy, the advantages and flexibility provided by the ability to combine policies into more and more complex policies can be readily appreciated. For example, the "working-hours" policy of the above example may be highly complex and regularly modified while the "after-hours" policy may be simple, never changed and thus left intact.

Figure 6:
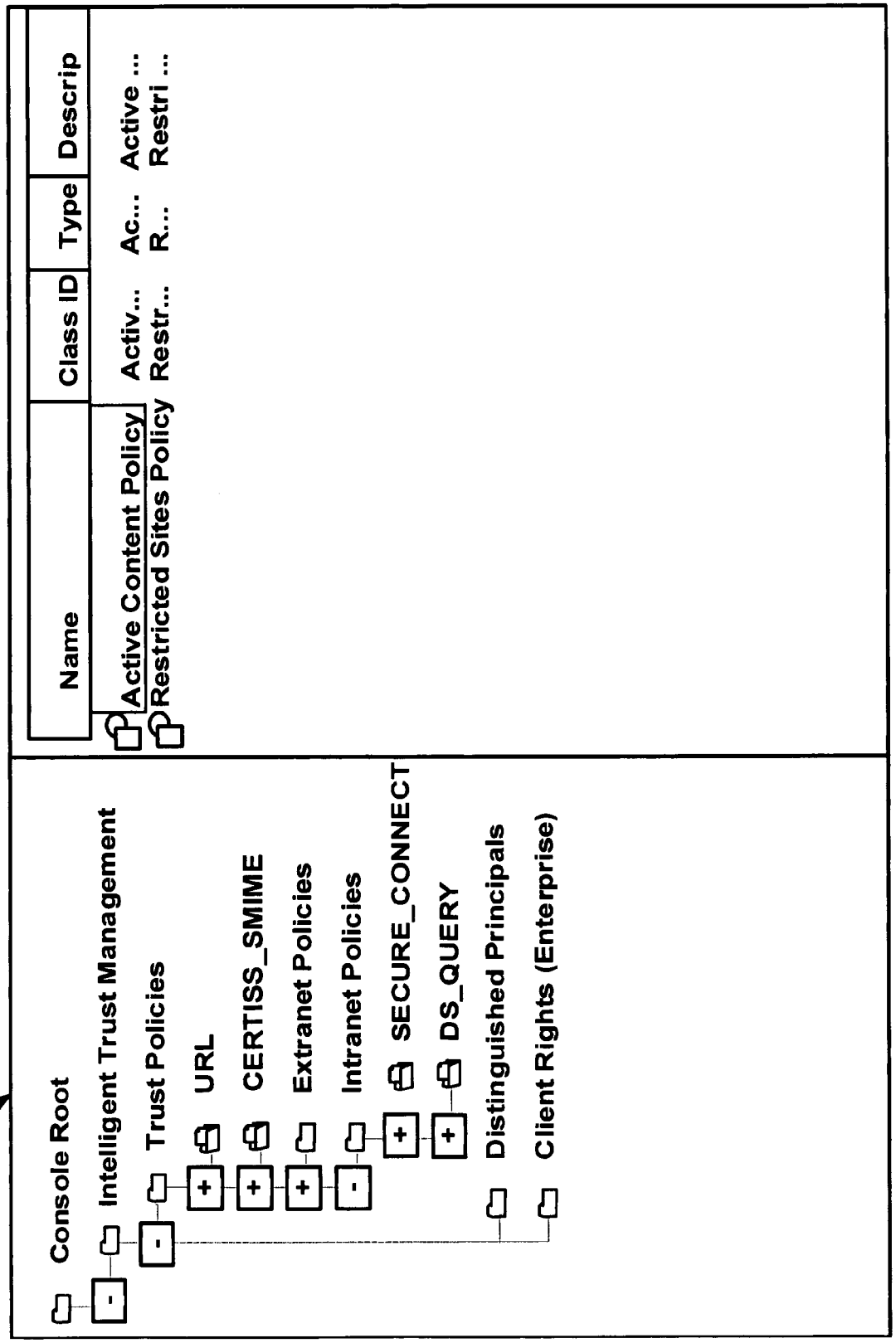
FIG. 6 is a representation of an editor mechanism for centrally administering policy objects.

Although not necessary to the present invention, to facilitate the administration of policies, a management tool (ITM Administrator) 84 is provided (FIG. 2). The management tool 84 makes it possible for administrators to view and centrally adjust policies affecting operation of the operating system and system components and applications at one time, using a system-provided configuration editor 86 (FIG. 6). As can be readily appreciated, this single, centralized tool is a significant advantage over multiple, widespread application-specific utilities. The management tool 84 communicates with the ITM policy manager 64 to display the editor interface 86 (FIG. 5) for viewing and adjusting the policies. Note that since policies are COM objects, they may be organized under folders in a logical, hierarchical grouping. Thus, as shown in FIG. 6, administrators may quickly locate a policy such as the "Active Content Policy" under the "Intranet" folder.

Moreover, as represented in FIG. 3, each policy object preferably includes its own administrator user interface 88. The administrator user interface 88 is opened when the administrator mouse clicks or otherwise appropriately selects a named policy. This provides for simple patches, updates and the like. For example, as described above, the purchase limit maintained as state within a policy object may be adjusted by the administrator via the administrator user interface. Note that with the present invention, system components are not directly bound to any particular dynamic link library (dll), and thus policies may be changed without needing to modify the system components (e.g., applications) or their settings.

It should be noted that a policy object itself governs the other policy objects that are used and how they are used. For example, a policy object may be present that decides not to allow any other policy object to be added or changed unless an administrator that has been authenticated makes the change and a digital signature of the policy object is first verified. In other words, a governing policy requires verification of a digital signature before a policy may be registered. Similarly, a policy may ensure that no policy may be invoked without first verifying a digital signature on that policy.

Note that policy objects may be written in advance (e.g., by third parties) and grouped into packages 90 (FIG. 2) or the like that are appropriate for a given system. Thus, a user only need install a policy package that is appropriate, and modify policies as needed from there. For example, policy objects for home users and small networks are likely to be quite different than policies of enterprise networks. Indeed, within an enterprise network, an administrator often needs to control many hundreds of machines, users and system components, which may be considerably difficult if a system component such as an application does not have explicit support for such administration.

The present invention enables the establishment and enforcement of policies that apply to the entire enterprise network. For example, an enterprise policy may be to disable the download of any unsigned executables from outside of the enterprise Intranet, ask a user before downloading signed code, but install any code that is from the Intranet without user intervention. To be effective, this policy needs to apply domain-wide, i.e., every user must be affected. To facilitate domain-wide administration, the Intelligent Trust Management System of the present invention enables administrators to designate some policies as "domain-wide, whereby the policy is automatically replicated to every machine participating in the domain, whereby these policies affect every single user.

Lastly, it should be noted that while the above-described model is advisory in that it is up to the system component (e.g., application) to comply with the policy decision, it is feasible to have an enforcement model wherein policy decisions prevent applications from taking denied actions. For example, applications may be run in security contexts set up by a policy, whereby that policy and other called policies would determine the applications' access to system resources.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method, comprising:
   maintaining a plurality of policies as centrally maintained application system resources available to one or more applications through an intelligent trust manager, wherein the policies are isolated from the one or more applications;
   implementing the plurality of policies in a plurality of policy objects, wherein the plurality of policy objects are organized in a hierarchical grouping;
   receiving action information, including data that identifies a proposed action, wherein the action information is used to obtain a first policy object of the plurality of policy objects corresponding to the proposed action;
   displaying at least one editor user interface on a display device for viewing and adjusting the plurality of policy objects;
   selecting, from the plurality of policy objects, the first policy object corresponding to the proposed action based on the data that identifies the proposed action;
   invoking the first policy object to obtain a decision made by the first policy object on the proposed action; and
   returning the decision in response to the action information that was received.

2. The method of claim 1, further comprising receiving argument data associated with the action information.

3. The method of claim 2, further comprising providing data corresponding to the argument data to the first policy object, wherein the first policy object evaluates the provided data to assist in making the decision.

4. The method of claim 1, wherein the first policy object accesses state information to assist in making the decision.

5. The method of claim 1, wherein the first policy object accesses dynamically variable information to assist in making the decision.

6. The method of claim 5, wherein accessing the dynamically variable information comprises communicating with a network site.

7. The method of claim 1, wherein the first policy object calls at least one other policy object to assist in making the decision.

8. The method of claim 7 wherein the first policy object mathematically combines a decision from the at least one other policy object to produce a final decision.

9. A computer storage medium storing a computer program of instructions for executing a computer-implemented method, the method comprising:
   maintaining a plurality of policies as centrally maintained application system resources available to one or more applications through an intelligent trust manager, wherein the policies are isolated from the one or more applications;
   implementing the plurality of policies in a plurality of policy objects, wherein the plurality of policy objects are organized in a hierarchical grouping;
   receiving action information, including data that identifies a proposed action, wherein the action information is used to obtain a first policy object of the plurality of policy objects corresponding to the proposed action;
   displaying at least one editor user interface on a display device for viewing and adjusting the plurality of policy objects;
   selecting, from the plurality of policy objects, the first policy object corresponding to the proposed action based on the data that identifies the proposed action;
   invoking the first policy object to obtain a decision made by the first policy object on the proposed action; and
   returning the decision in response to the action information that was received.

10. The computer storage medium of claim 9, the method further comprising receiving argument data associated with the action information.

11. The computer storage medium of claim 10, the method further comprising providing data corresponding to the argument data to the first policy object, wherein the first policy object evaluates the provided data to assist in making the decision.

12. The computer storage medium of claim 9, wherein the first policy object accesses state information to assist in making the decision.

13. The computer storage medium of claim 9, wherein the first policy object accesses dynamically variable information to assist in making the decision.

14. The computer storage medium of claim 13, wherein accessing the dynamically variable information comprises communicating with a network site.

15. The computer storage medium of claim 9, wherein the first policy object calls at least one other policy object to assist in making the decision.

16. The computer storage medium of claim 15, wherein the first policy object mathematically combines a decision from the at least one other policy object to produce a final decision.

* * * * *